United States Patent [19]

Marshall

[11] 3,757,029

[45] Sept. 4, 1973

[54] SHIELDED FLAT CABLE

[75] Inventor: Joseph Marshall, Trenton, N.J.

[73] Assignee: Thomas & Betts Corporation, Elizabeth, N.J.

[22] Filed: Aug. 14, 1972

[21] Appl. No.: 280,528

[52] U.S. Cl. ........... 174/36, 174/117 F, 174/117 FF

[51] Int. Cl. ........................................... H01b 11/06

[58] Field of Search ..................... 174/117 R, 117 F, 174/117 FF, 36, 110 V; 333/84 M

[56] References Cited

UNITED STATES PATENTS

| | | | |
|---|---|---|---|
| 2,413,673 | 12/1946 | Sears | 174/110 V |
| 3,391,246 | 7/1968 | Freeman | 174/117 FF |
| 3,576,941 | 8/1969 | Colglazier | 174/117 FF |
| 3,582,532 | 11/1969 | Plummer | 174/117 FF |
| 3,586,757 | 6/1971 | Haldeman | 174/117 FF |
| 3,612,744 | 10/1971 | Thomas | 174/117 FF |

*Primary Examiner*—E. A. Goldberg
*Attorney*—David Teschner et al.

[57] ABSTRACT

Two or more elongate, longitudinally aligned layers each having one or more electrically conductive elements at least partially embedded therein, and which may include a shield layer, are slidably disposed adjacent one another in overlapping relationship and tightly enclosed within an integral flexible plastic covering which may be extruded thereover to provide a multilayer flat cable assembly so arranged that upon the severance of the flexible plastic covering each of the layers is exposed and readily manipulatable for conveneint access to the individual conductive elements of the cable. The shield layer includes a plastic layer and the plastic cover may be bonded to the plastic layer.

5 Claims, 10 Drawing Figures

PATENTED SEP 4 1973 3,757,029

SHEET 2 OF 3

SHIELDED FLAT CABLE

BACKGROUND OF THE INVENTION

1. Field of the Invention

The invention is directed to the field of electrical cables and principally to flat cable construction.

2. Description of the Prior Art:

Ribbon-like flexible flat cable comprising a plurality of individual conductors embedded in a suitable dielectric medium, as exemplified for example, in U.S. Pat. No. 3,168,617, issued Feb. 2, 1965, to H. W. Richter have attained increased popularity for use in power and low and high frequency signal transmission applications due to the compactness and flexibility of such structure. In those applications where insufficient conductors are available in a single flat cable layer, two or more layers may be extended between the points to be interconnected, the cables being held either by clamp-like devices selectively spaced along the length of the cable run, or by taping the layers together at spaced intervals. The employment of discrete plastic or metallic loops or clamps in such applications generally involves a laborious, time-consuming and expensive operation, which in many instances may still fail to eliminate the tendency of the individual layers of such cables to separate between the clamped or taped junctures thereby reducing the integrity and security of the assembly. Another embodiment of flat cable construction according to the prior art as exemplified, for example in U.S. Pat. No. 3,634,782, for Coaxial Flat Cable, issued to the instant applicant Joseph Marshall on Jan. 11, 1972, and assigned to the assignee of the instant invention discloses the use of a braided wire electrical shield surrounding the dielectrically enclosed flat cable conductors. To insulate and protect the shield from damage and inadvertant contact with adjacent surfaces, one form or another of insulating material was generally extruded about the resulting assemlby, thus forming a composite laminate of relatively immobilized interbonded layers whereby the flexibility of the finished cable was seriously reduced. Further, the attachment thereto of terminating devices was seriously hampered due to the tedious and time-consuming operation required to remove the insulating material from the metallic shield to provide a bare surface for the attachment thereto of a further conductive member.

SUMMARY OF THE INVENTION

The invention overcomes the difficulties and limitations noted above with respect to prior art devices by providing a multilayer flat cable and method of making the same, whereby the individual layers thereof may be readily manipulated and exposed for convenient termination thereto more simply, conveniently, and rapidly than with such prior art devices. A plastic covering, which, in one embodiment, may be formed of a flexible vinyl material, is disposed over a series of discrete flexible plastic layers each having at least one conductive element at least partially embedded therewithin. One of the layers may include a flat cable prelaminate in which a plurality of spaced, parallel conductors are disposed within the plastic material while another of the layers may include a relatively thin strip of electrically conductive material, such as copper, aluminum, or the like, extending essentially the width of such plastic layer. The layers are disposed in overlapping slidable relationship with respect to one another in generally longitudinally alignment, each of the layers thus being independently manipulatable upon the severance of the plastic covering. The resulting configuration may be effectively utilized as a shielded cable wherein, upon the severance of the outer flexible plastic covering, a selective portion of each of the interior layers including the shield layer is rendered conveniently accessible and readily manipulatable for termination thereto. Since the individual layers are unbonded one to another, the composite assembly may advantageously be employed in those applications in which a high degree of flexibility is necessary or desirable. The outer flexible covering of the multilayer flat cable assembly, which in one embodiment comprises preferably a flexible vinyl chloride may be conveniently disposed thereover by extrusion in a relatively simple, inexpensive, and highly convenient manufacturing process. Although such covering may be readily severed and the encompassed individual layers removed therefrom, by proper choice of the materials used for the outer covering and the prelaminate structure of each of the individual layers, adhesion between the outer surface of the layers and the adjacent vinyl covering is thereby reduced or eliminated completely, thereby simplifing the task of exposing suitable areas of the conductive elements for termination thereto. Other embodiments include a multilayer assembly comprising a plurality of overlapping flat cable layers each having a plurality of individual parallel spaced conductive elements embedded therein. It is therefore an object of this invention to provide a multilayer flat cable and a method of making the same.

It is another object of this invention to provide an enclosed multilayer flat cable in which the discrete layers thereof may be readily exposed upon the severance of the outer covering.

It is a further object of this invention to provide an insulated shielded multilayer flat cable.

It is still a further object of this invention to provide a simple, effective and convenient means for enclosing a plurality of layers of flat cable while maintaining the flexibility thereof.

Other objects and features will be pointed out in the following description and claims and illustrated in the accompanying drawings which disclose by way of example the principle of the invention and the best modes contemplated for carrying it out.

BRIEF DESCRIPTION OF THE DRAWINGS

In the Drawings.

Similar elements are given similar reference characters in each of the respective drawings.

DESCRIPTION OF THE PREFERRED EMBODIMENTS

Figure 1:
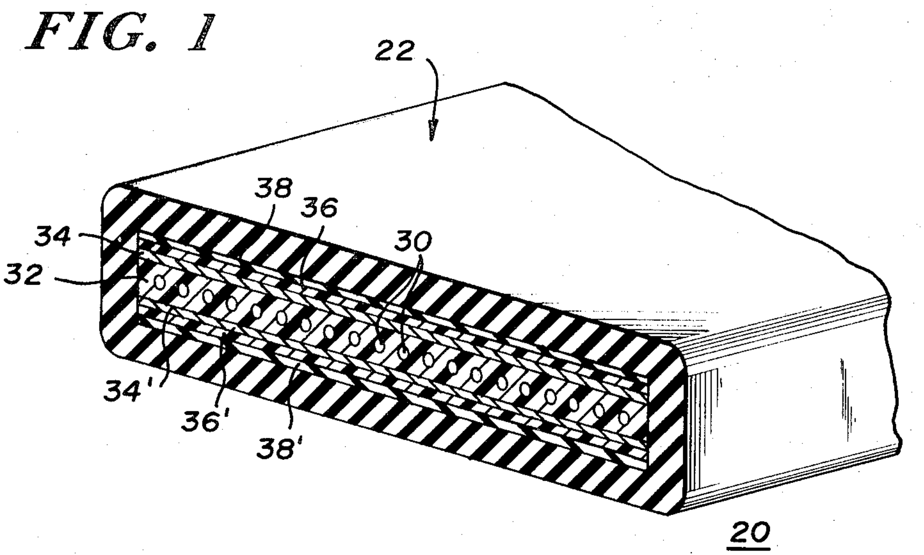
FIG. 1 is a fragmentary perspective view, in section, of a multilayer flat cable constructed in accordance with the concepts of the invention.
Figure 2:
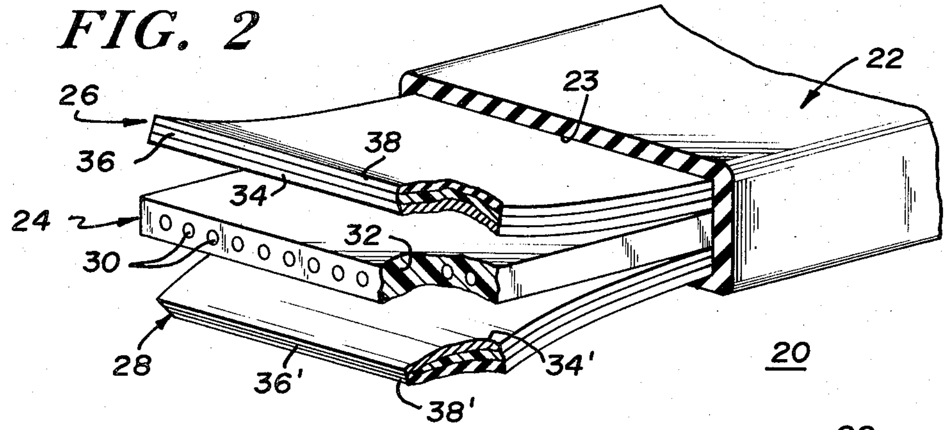
FIG. 2 is a fragmentary perspective view, partly in section, of the device of FIG. 1 with a portion of the outer covering thereof cut away to expose the inner layers.
Figure 3:
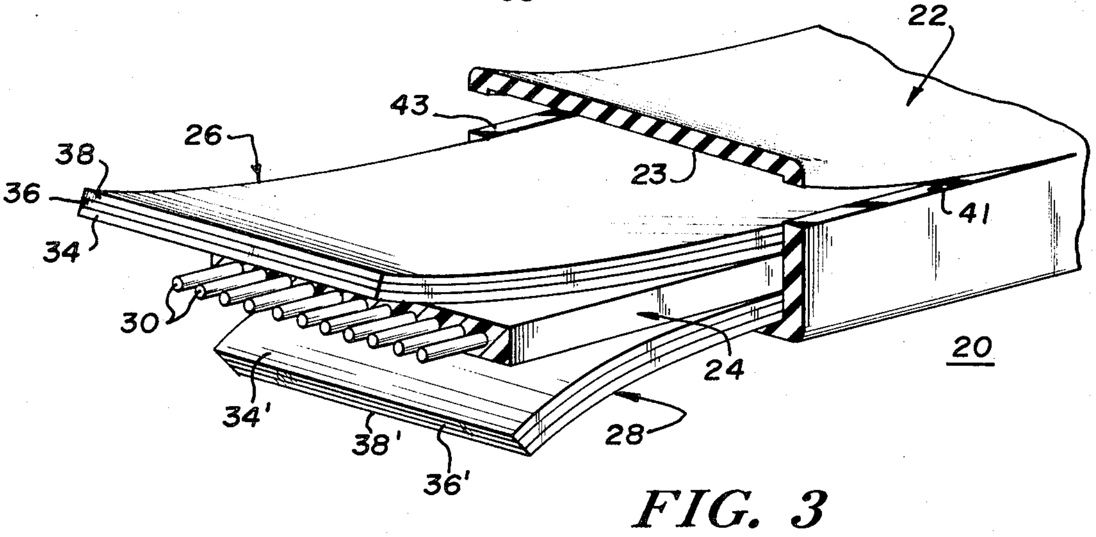
FIG. 3 is a fragmentary perspective view, partly in section, of the device of FIGS. 1 illustrating a manner in which the outer covering may be severed to expose the interior layers.
Figure 6:
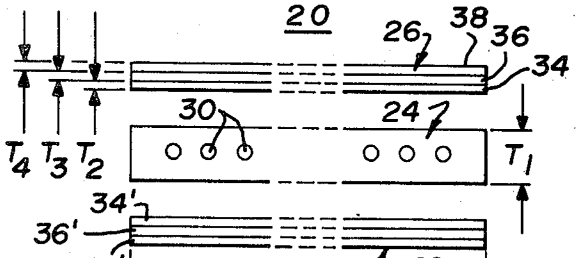
FIG. 6 is an exploded front elevational view, partly in section, of the device of FIG. 1.

Turning now to FIGS. 1, 2 and 3 there is shown a multilayer flat cable 20 constructed in the accordance with the concepts of the invention. Encompassed within a flexible outer plastic covering 22, having an inner surface 23, and which may comprise a vinyl chloride material or the like, are three flexible plastic layers 24, 26, and 28 arranged in longitudinally aligned overlapping slidable relationship one to the other, as illustrated. Layer 24, comprising a plurality of parallel spaced longitudinally extending conductive elements 30 embedded in a suitable plastic material 32, which may comprise a dielectric material such as polyester film, is disposed intermediate the two outer layers 26 and 28, said outer layers 26 and 28 each being constructed to define a bonded laminated structure consisting, respectively, of a conductive metallic strip 34, 34′ bonded to a polyester film 36, 36′ which is further bounded to a flexible plastic material 38, 38′ such as vinyl chloride or the like. The strips 34, 34′ which may be formed of copper, aluminum, or appropriate alloys thereof extend across essentially the entire width of each of their respective layers 26 and 28. As shown, each of the layers 26 and 28 are positioned with respect to the central layer 24 so that the respective metallic conductive strips 34, 34′ face inwardly towards the central layer 24 while the respective outer layers 38, 38′ thereof are disposed directly adjacent the outer covering 22. Accordingly, the inner surface 23 of the flexible outer covering 22 is caused to contact and may bond to the outer surfaces of plastic portions 38, 38′ of the respective layers 26, and 28, leaving exposed the opposing bare surface of each of the conductive strips 34, 34′. Thus, termination to each of the strips 34, 34′ may be readily accomplished without the need for removing any insulation therefrom. The high degree of flexibility attributable to the aforementioned structure is due principally to the fact that each of the layers 24, 26 and 28 are longitudinally displaceable with respect to an adjacent layer while adequately and completely enclosed within the outer flexible covering 22. Thus, the cable 20 may be so flexed as to define an extremely tight bend, where necessary or desirable, without subjecting the cable to undue stress thereby. Although the metallic strips 34 and 34′ are shown as forming one exposed surface of the laminated layers 26, 28 respectively, this arrangement may be conveniently modified whereby the metallic strips 34, 34′ are encased wholly within a plastic layer whereby a connection to such metallic strip may be readily and conveniently accomplished by the use of an insulation piercing connector of the type exemplified, for example, in U.S. Pat. No. 3,549,786 issued Dec. 22, 1970, to Kuo and assigned to the assignee of the instant invention, thereby obviating the necessity for removing the insulative plastic covering therefrom to expose the bare metallic surface. In either case, an insulation piercing connector, as shown for example at 40 in FIG. 5, may be employed to establish a connection between the metallic strip 34 and a further conductive member 42, although such connection may also be established by soldering, crimping, welding or other well known joining techniques. It will of course be readily appreciated that where a double shielded multilayer cable is employed, both shields may be terminated in a similar fashion to provide a continuous shield about the central conductors 30. Merely by way of example, and not as a limitation or restriction with regard to the inventive concepts disclosed herein, reference is now made specifically to FIG. 6 wherein there is shown an exploded view of the multilayer cable 20 illustrated in FIG. 1, wherein $T_1$, is the thickness of the plastic layer 24 comprising the conductors 30, $T_2$ is the thickness of the electrically conductive strip 34 of layer 26; $T_3$ is the thickness of the adjacent portion 36 of layer 26 to which strip 34 is bonded; $T_4$ is the thickness of the outer plastic portion 38 of layer 38; and $W_1$ is the width of the multilayer flat cable 20, less the thickness of the plastic outer covering 22. Since the remaining layer 28 is essentially duplicative of layer 26 in the embodiment illustrated in FIGS. 1 and 6, the dimensions found convenient for the construction of layer 26 will be deemed applicable to layer 28. A set of values found convenient for use in the construction of a multilayer flat cable such as 20 are given below. It will, of course, be readily appreciated that such values are approximate only, and may be suitably varied or modified, as necessary or desirable, either for manufacturing convenience, or to suit a particular application. In the example illustrated, $T_1 = 0.008$ inches $T_2 = 0.0007$ inches; $T_3 = 0.001$ inches; $T_4 = 0.001$ inches; and $W_1 = 1,100$ inches. A convenient thickness for the flexible plastic covering 22 thereover was found to be in the order of 0.020 inches, which thickness, of course, may be readily increased or decreased, as desired. The central layer 24 may comprise a plurality of copper conductors 30 bonded between two adhesive coated films formed, for example, from a polyester resin, with the adhesive surfaces of the two films being disposed in face-to-face relationship with the conductors 30 encapsulated therebetween. Each of the shield prelaminate layers 26 and 28 may comprise a copper strip 34 backed by a polyester film 36, which may be further backed by a flexible vinyl film 38. The outer flexible covering 22 may be formed of flexible vinyl chloride extruded over the three layers to complete the assembly.

Each of the layers may be readily exposed for termination thereto in a manner more clearly illustrated in FIG. 3. As shown therein the outer covering 22 is preferably slit as at 41, 43 to expose a selective length of each of the layers 24, 26, and 28 to provide access to the ends thereof for termination thereto. As further illustrated in FIG. 3, a portion of the plastic layer 24 has been cut away to expose a selective length of the conductors 30 preparatory to the termination thereof to a further member, such as a multiple contact flat cable connector or the like (not shown). The outside layers 26 and 28 are now also accessible for termination. Although the inner surface of the outer covering 22 is shown separated from the adjacent surfaces of layers 26 and 28, in practice these surfaces may be joined together while still permitting convenient access to the conductive strips 34 and 34′ since, upon the severance of the covering 22, the outer layers 26 and 28 may be conveniently manipulated to expose a selective length of the bare surfaces of strips 34, 34′ for termination thereto while obviating the need for removing the insulative covering 22 from the opposing surface of the layers 26 and 28. Although the covering 22 is shown longitudinally slit to expose the interior of cable 20, a transverse or oblique slit may be employed to effect a similar result.

Figures 4, 5:
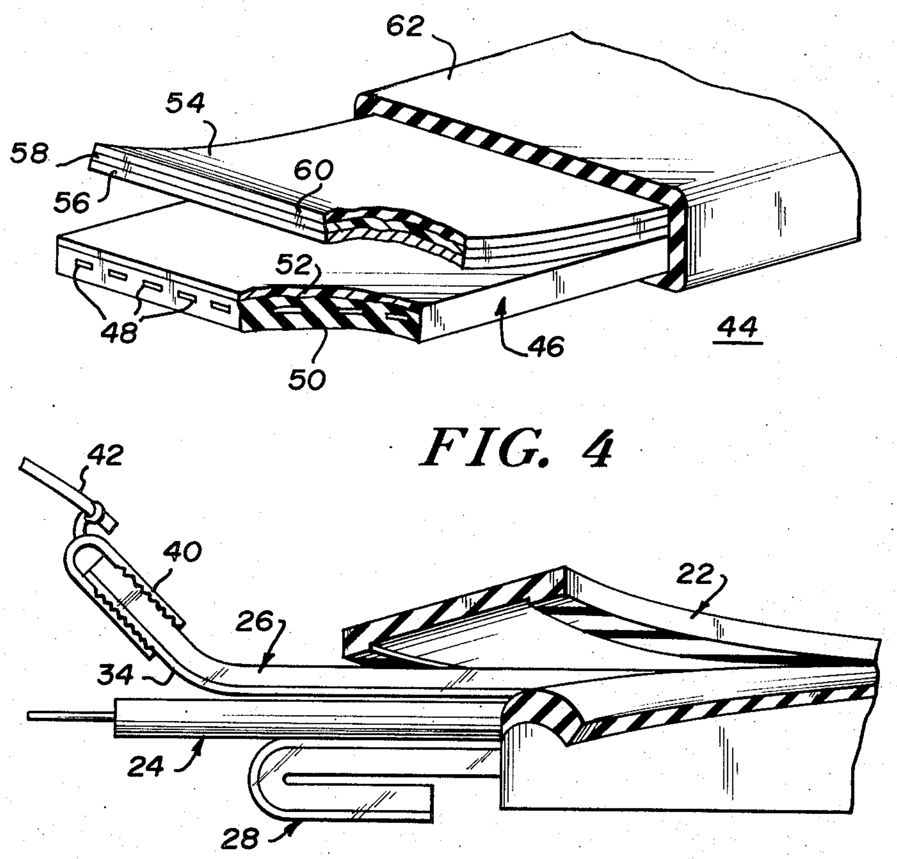
FIG. 4 is a fragmentary perspective view, partly in section, of a further embodiment of a multilayer flat cable constructed in accordance with the concepts of the invention.
FIG. 5 is a fragmentary perspective view, partly in section, of the device of FIG. 1 showing the layers thereof arranged for attachment to terminating means.

Turning now to FIG. 4 there is shown a further embodiment of a multilayer flat cable 44 constructed in accordance with the concepts of the invention. As illustrated, cable 44 comprises a first layer 46 having a plurality of metallic conductive elements 48 embedded within a first plastic portion 50 which is bonded to a further plastic portion 52, wherein portion 50 may be formed from a thermoplastic material such as flexible vinyl chloride, while portion 52 may be formed from a polyester film or similar material. A second layer 54 is disposed in longitudinally aligned overlapping slidable relationship with respect to layer 46 in a manner similar to that described above with respect to layers 24, 26 and 28 of cable 20. Layer 54 is essentially duplicative of either of the layers 26 and 28 shown in FIGS. 1, 2 and 3, thereby comprising a bonded laminate including a metallic strip 56, a first plastic portion 58 disposed thereover, and bonded thereto, and a second plastic portion 60 disposed over and bonded to portion 58 forming a composite structure readily adaptable as a shield layer for the conductors 48 of layer 46. A flexible plastic covering 62 similar to covering 22 of cable 20 is disposed over the two layers 46 and 54 to provide an intimate covering thereover substantially as described above with respect to cable 20 illustrated in FIGS. 1, 2 and 3, which covering 62 similarly may be formed of a flexible plastic material such as vinyl chloride or the like.

Figure 7:
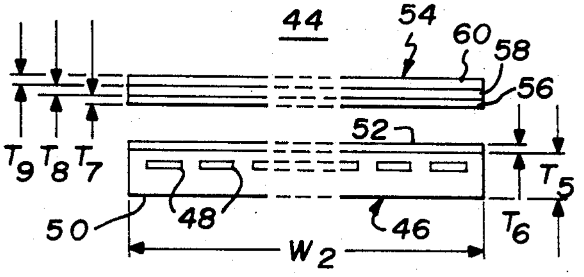
FIG. 7 is an exploded front elevational view, partly in section, of the device of FIG. 4.

For purposes of illustration, and merely by way of example, reference is now made specifically to FIG. 7 wherein there is shown an exploded view of the embodiment illustrated in FIG. 4 and wherein $T_5$ is the thickness of the first plastic portion 50 of layer 46; $T_6$ is the thickness of the second plastic portion 52 of layer 46; $T_7$, $T_8$, and $T_9$ are the thicknesses, respectively, of portions 56, 58, and 60, of layer 54, which is essentially duplicative of layer 26 illustrated in FIG. 6; and $W_2$ is the width of cable 44, less the thickness of the outer covering 62. Here again, the following set of values, although found convenient for use in the construction of a multilayer flat cable such as 44, is not intended to be limiting or restrictive with respect thereto, such values being approximate only, and readily modifiable, as necessary or desirable, without departing from the spirit of the invention and within the concepts herein disclosed. In the example shown in FIG. 7, $T_5 = 0.012$ inches; $T_6 = 0.001$ inches; $W_2 = 1.100$ inches; and $T_7$, $T_8$, and $T_9$ having values essentially equal to those given above for $T_2$, $T_3$, and $T_4$, with reference to FIG. 6. And, as indicated above, the flexible outer covering 62 may have a thickness of approximately 0.020 inches, although, of course, such thickness may be suitably increased or decreaed, as necessary or desirable.

Figures 9, 10:
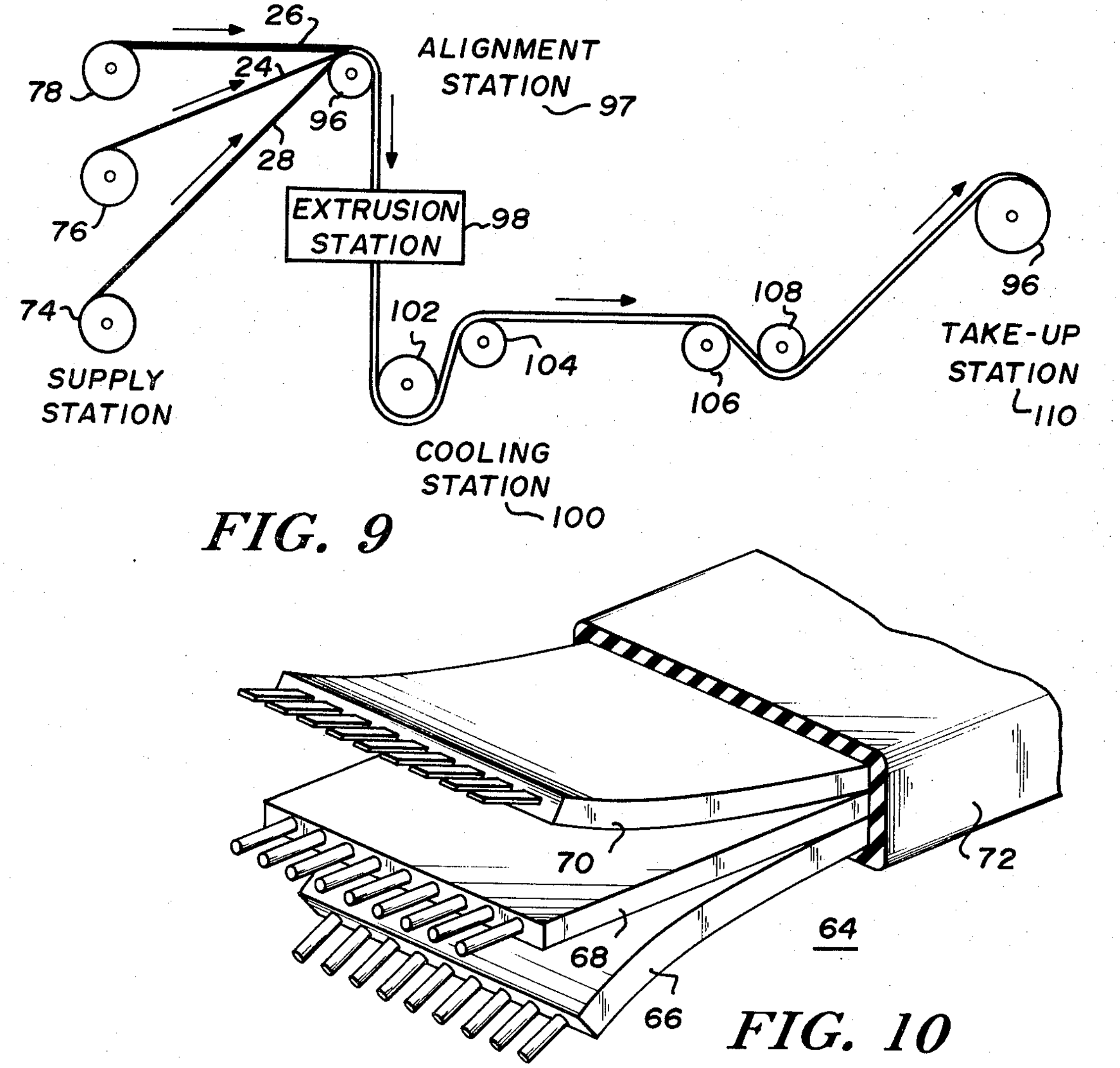
FIG. 10 is a fragmentary perspective view, partly in section, of a further embodiment of a multilayer flat cable constructed in accordance with the concepts of the invention.

Although the multilayer flat cables 20 and 44 illustrated respectively in FIGS. 2 and 4 may be utilized as shielded flat cables, both of the shield layers 26, 28 or 54 may be replaced by a further multiconductor flat cable to provide an arrangement such as indicated at 64 in FIG. 10, wherein there is shown three multiconductor flat cable layers 66, 68 and 70 disposed in slidable overlapping arrangement similar to that described above with respect to the embodiments illustrated in FIGS. 2 and 4. Disposed about the layers 66, 68 and 70 is a flexible plastic covering 72 substantially equivalent to the coverings 22 and 62 of cables 20 and 44, respectively. Accordingly, by slitting or otherwise parting the flexible outer covering 72, each of the individual layers 66, 68 and 70 of cable 64 may be conveniently exposed and a portion of the plastic material of which each of such layers is formed removed to expose a selective portion of the conductors embedded therein for termination in a manner essentially similar to that described above with respect to cables 20 and 44. The outer flexible plastic covering 72 or 22 may be formed of a material commensurate with the application for which such multilayer flat cable is to be adapted, which may thusly include materials resistant to acids, alkalies and other adverse environmental elements.

Figure 8:
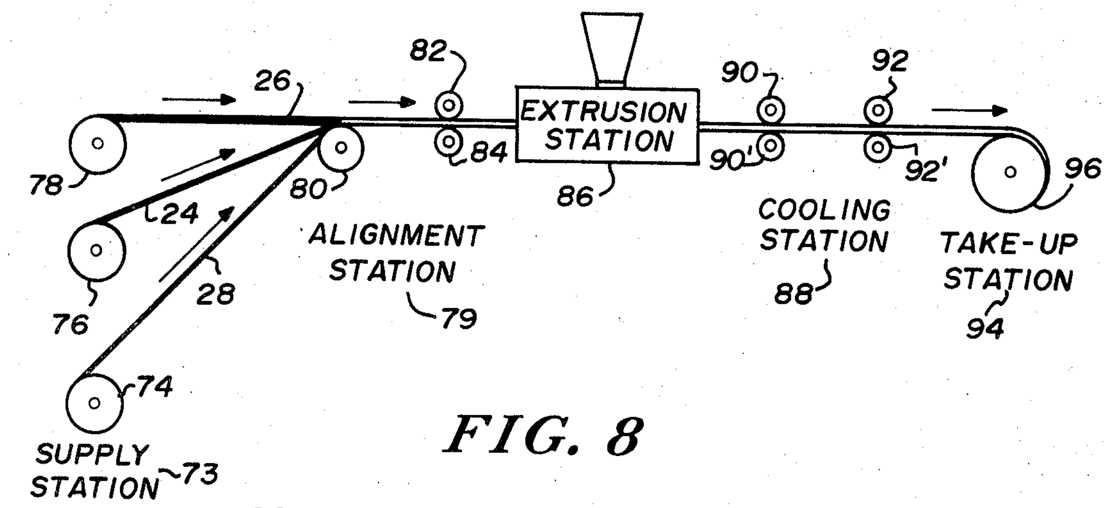
FIGS. 8 and 9 are schematic representations illustrating two methods of making a multilayer flat cable according to the concepts of the invention.

Turning now to FIGS. 8 and 9, there are shown two typical methods of forming a multilayer flat cable constructed in accordance with the concepts of the invention. For the sake of convenience and simplicity, a method for forming a three layer flat cable such as cable 20 will be described, although it will be readily apparent to those skilled in the art that flat cables comprising two, four, or more layers may be similarly formed, within the concepts herein disclosed. Three supply reels 74, 76, and 78, respectively, located at a supply station 73, each carry one of the respective layers 28, 24 and 26, the outer layers 26 and 28 being carried by the supply rolls 78, and 74, respectively, and layer 24 being carried by the supply roll 76. The three layers are advanced from the supply station 73 to an alignment station 79 comprising preferably a support roll 80 followed by 2 nip rollers 82 and 84 for longitudinally aligning the layers 24, 26 and 28 prior to their generally horizontal advancement to an extrusion station 86 which may comprise, for example, a quantity of molten plastic material such as vinyl chloride or the like. One material found useful as a flexible plastic covering for use in the instant invention is a vinyl chloride designated as Geon No. 8804, furnished by the B.F. Goodrich Chemical Company of Englewood Cliffs, New Jersey. After passing through appropriate dies in the extrusion station 86, the assembled cable comprising the three layers 24, 26 and 28 disposed within a vinyl covering is advanced to a coolng station 88 which may comprise a series of chill rolls such as 90, 90′ and 92, 92′ or in the alternative, a suitable enclosure in the form, for example, of a quenching tank or the like (not shown). The assembled cable may now be advanced to a take-up station 94, which may include a take-up roll such as 96 or other convenient receptacle. The rate of progression of the individual layers 24, 26 and 28 through the respective stations will be at least partly dependent upon the thickness of the outer covering desired, the tolerances to be maintained, and the rate of quenching or cooling. In the method shown in FIG. 9, the layers 24, 26, and 28 are fed from the supply rolls 74, 76 and 78, respectively, to an alignment station 97 which may comprise a roll such as 96 suitably flanged wherein each of the layers 24, 26 and 28 passing thereover are longitudinally aligned in overlapping relationship for advancement to an extrusion station 98. It should be noted that in the method employed in FIG. 9 the aligned layers 24, 26 and 28, after leaving the alignment station 97, are fed generally vertically to the extrusion station 98, substantially as shown. It will of course be readily apparent to those skilled in the art that the layers 24, 26 and 28 may be positionally advanced from the alignment station 97 to the extrusion station 98 at other appropriate angles without departing from the spirit of the invention and within the concepts herein disclosed. The cable assembly including the layers 24, 26 and 28 with a flexible plastic covering extruded thereabout is then advanced to a cooling station 100 which may comprise one or more chill rolls such as 102, 104, or a quench bath (not shown) such as may be employed for example in the method shown in FIG. 8. The covered multilayer flat cable may then be advanced to one or more guide or tension rolls such as 106 and 108 and thence to a take-up station 110 which may include a reel such as 96 or other convenient cable receptacle. It will, of course, be readily apparent to those skilled in the art that the methods illustrated in FIGS. 8 and 9 may be readily adapted to the manufacture of multilayer flat cable comprising either two, four, or more layers, it being necessary merely to insure that a sufficient number of supply rolls are provided commensurate with the number of layers to be assembled.

An indicated heretofore, the inner surface 23 of the outer covering 22 may bond or fuse to the adjacent surface of the enclosed flat cable layers where, for example, the outer covering 22 and the adjacent sub-layer of the enclosed layers are formed from vinyl material. The flexibility of the flat cable assembly is, of course essentially unaltered under such condition since the individual layers are each still disposed in slidable relationship with respect to one another. To expose the conductive under surface of the adjacent layer or layers, the outer covering 22 is slit or severed, as heretofore described, and the severed portion, together with the layer fused thereto, folded back on itself, thereby obviating the need for separating such layer from the outer covering 22 to render the conductive surface readily accessible.

The embodiments of the invention in which an exclusive property or privilege is claimed are defined as follows:

1. Multilayer shielded flat cable comprising: a first elongate layer having a plurality of generally parallel conductors embedded in a planar sheet of flexible plastic insulating material; at least one shield layer having a width equal to the width of said first layer and having a flat contiguous sheet of electrically conductive material coated on one side only with at least one planar sheet of flexible plastic insulating material, said first and said shield layers being disposed in generally longitudinally overlapping slidable relationship one to the other with the uncoated side of said flat sheet of electrically conductive material facing said first layer; and a readily severable integral jacket of flexible plastic insulating material intimately encompassing said first and said shield layers, said jacket being bonded to said coating on said flat sheet of electrically conductive material to permit full exposure of the uncoated side of said flat sheet of electrically conductive material upon severance of said jacket.

2. Multilayer shielded flat cable as defined in claim 1 wherein said first layer planar sheet of flexible plastic insulating material is formed from flexible vinyl material.

3. Multilayer shielded flat cable as defined in claim 1 comprising two said shield layers, each having a flat contiguous sheet of electrically conductive material coated on one side only with at least one planar sheet of flexible plastic insulating material, said two shield layers being disposed on opposing sides of said first layer, the three layers being disposed in generally longitudinally overlapping slidable relationship one to another with the uncoated side of said flat sheet of electrically conductive material of each of said shield layers facing said first layer, said jacket intimately encompassing said first and said two shield layers and bonded to said coating on each of said flat sheets of electrically conductive material.

4. Multilayer shielded flat cable as defined in claim 1 wherein said coating on said flat contiguous sheet of electrically conductive material comprises a composite plastic structure formed of bonded layers of selective plastic insulating materials.

5. Multilayer flat cable as defined in claim 4 wherein at least one of said layers comprising said composite plastic structure is formed from polyester resin.

* * * * *